Patented Mar. 2, 1943

2,312,863

UNITED STATES PATENT OFFICE 2,312,863

POLYMERIZATION PRODUCTS

Herbert Bestian, Frankfort-on-the-Main-Unterliederbach, Germany, assignor, by mesne assignments, to General Aniline & Film Corporation, New York, N. Y., a corporation of Delaware No Drawing. Application March 2, 1940, Serial No. 322,031. In Germany February 17, 1939

6 Claims. (Cl. 260—2)

The present invention relates to polymerization products.

I have found that the products of the general formula:

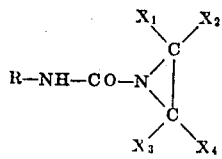

wherein R stands for a substituent of the group consisting of hydrogen, alkyl, alkylene, aralkyl and cycloalkyl, and $X_1$, $X_2$, $X_3$, $X_4$ stand for substituents of the group consisting of hydrogen, alkyl, aryl and aralkyl, may be transformed under usual working conditions into polymeric substances containing nitrogen. The starting materials are obtained by causing equivalent amounts of aliphatic, cycloaliphatic or araliphatic monoisocyanates to react with ethyleneimine or the homologues thereof, for instance at a temperature between about 0° and about 50° C. and in the presence of a solvent, for instance acetone or ether.

In their monomeric form, the products thus obtained may, if necessary, be isolated in pure state before the polymerization by recrystallization. After having been polymerized, the products are clear, colorless, thermoplastic, balsamlike to solid hard resins. The unsubstituted parent substances or those substituted only by residues having a low molecular weight yield polymerizates still soluble in water. The polymerizates of the parent substances substituted by residues having a high molecular weight, however, are insoluble in dilute acids and alkalies. The new products are typical plastic materials which answer all requirements of the known plastic materials.

As starting substances there may, for instance, be used: the N.N-ethylene urea not substituted at the nitrogen atom, furthermore the N-substitution products thereof. As substituents at the nitrogen there may be present: methyl, ethyl, propyl, isopropyl, butyl, isobutyl, amyl, isoamyl, furthermore saturated alkyl radicals of high molecular weight, for instance the octodecyl radical. There may likewise be present the corresponding olefinic hydrocarbon radicals, for instance the allyl radical —CH₂—CH=CH₂ or the heptadecenyl radical corresponding to the oleic acid. By the definition "alkyl" there are also understood the halogenated radicals, for instance —CHCl—CH₃ or —CH₂—CH₂Cl as well as the corresponding bromine compounds. There are likewise suitable starting substances substituted at the nitrogen by benzyl, phenyl-ethyl —CH₂—CH₂—C₆H₅, ortho-xylyl

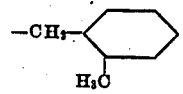

as well as meta- and para-tolyl, the xylyl radicals, para-dodecylbenzyl, para-dodecyltolyl, finally cyclohexyl, the methyl-cyclohexyl radicals, also

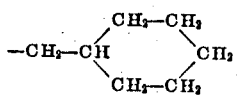

dicyclohexylyl, decahydronaphthyl. The hydrogen atoms of the ethylene group may partly or entirely be substituted by methyl, ethyl, propyl, isopropyl, butyl, isobutyl, amyl, isoamyl, decyl, furthermore by phenyl, the methyl-phenyl radicals, benzyl and -ortho-, -meta- and -para-tolyl. Two, three or all of the four hydrogen atoms may likewise be substituted by two, three or four different substituents named above.

The polymerization is preferably carried out by suitably heating the products to temperatures above the melting point of the pure monomeric compounds. A test portion shows without difficulty the termination of the polymerization. The polymerization may be accelerated by the addition of catalysts. Thereby the polymerization takes place already at room temperature. As such catalysts there are preferably used: acid substances such as hydrochloric acid, sulfuric acid, phosphoric acid, acetic acid, tartaric acid, benzene sulfonic acid, toluene sulfonic acid, sulfur dioxide, carbon dioxide, sodium bisulfate and potassium bisulfate, aluminium chloride.

There may likewise be polymerized mixtures of the above-named starting substances; interpolymerization products are thereby obtained. The polymerization may, furthermore, likewise be carried out in the presence of solvents like water, ethyl alcohol, propyl alcohol, isopropyl alcohol, butyl alcohol, isobutyl alcohol and other alcohols. Finally, the polymerization may also take place in an aqueous dispersion, the water-insoluble final products being especially suitable therefor.

The following examples serve to illustrate the invention, but they are not intended to limit it thereto:

1. A quantity of the N.N.-ethylene urea of the formula:

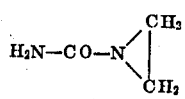

obtained by reaction of isocyanic acid with ethyleneimine is dissolved in an equal amount of water. By heating the solution to about 80° C. to 90° C. a rapid polymerization sets in, a considerable quantity of heat being evolved thereby. The aqueous solution begins to boil and, as soon as boiling has ceased, it is further heated to boiling for half an hour. After cooling, a viscous solution is obtained containing 50 per cent. of the polymeric urea. The N.N-ethylene urea may likewise be polymerized already at a low temperature, the polymerization period being accordingly prolonged. The product is a clear, colorless, thermoplastic resin soluble in water.

2. N-methyl-N'.N'-ethyleneurea of the formula:

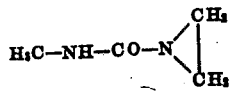

obtained by the reaction of methylisocyanate with ethyleneimine is heated to 40° C. Care is taken by stirring and well cooling that the heat evolved during the polymerization is eliminated. The melt is first thinly liquid and becomes more viscous on further heating. When the polymerization has advanced to such an extent that evolution of heat begins to cease, the mass is cautiously heated to 80° C.; at this temperature the polymerization is completed by heating for several hours. After cooling, a viscous liquid soluble in water is obtained.

3. N-chloroethyl-N'.N'-ethylene urea of the formula:

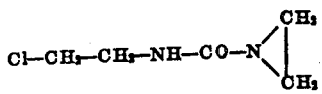

obtained by reaction of beta-chloroethylisocyanate with ethyleneimine is melted by heating to 50° C. The temperature of the melted mass is then raised to 70° C. and constantly kept at this temperature for 5 hours. For the purpose of eliminating the heat produced by polymerization the melt is stirred for as long a time as the viscosity of the melt increasing with the duration of heating allows it. A highly viscous, colorless plastic material is obtained which solidifies on cooling.

4. N-isobutyl-N'.N'-ethyleneurea of the formula:

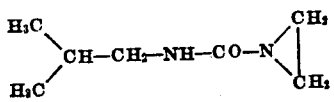

obtained by reaction of isobutylisocyanate with ethyleneimine are heated for 10 hours, while stirring, to 50° C. to 60° C. The thinly liquid melt obtained gradually becomes more viscous. A highly viscous mass is obtained which is insoluble in water but readily soluble in ethyl alcohol and butanol.

5. A quantity of the N-cyclohexyl-N'.N'-ethylene urea of the formula:

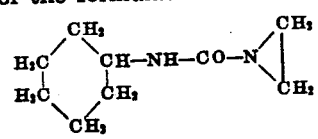

obtained by reaction of cyclohexylisocyanate with ethyleneimine is melted and the melt is then heated for 10 hours at 110° C. In order to eliminate the heat produced by polymerization, the melt is stirred for some time according to the viscosity of the melt. On cooling, a hard resin clear as glass is obtained which is insoluble in water, dilute acids and alkalies.

Since the resin has no net-like structure, it is thermoplastic and can be moulded to any desired form.

6. N-dodecyl-N'.N'-ethyleneurea of the formula:

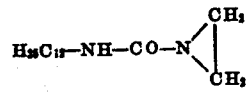

prepared by reaction of dodecylisocyanate with ethylene imine is melted and the melt is then heated for 5 hours to 150° C. A colorless, waxlike resin is obtained having a low softening point.

I claim:

1. Polymerization products of compounds of the following formula:

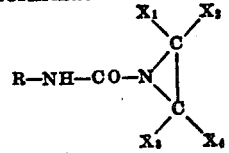

wherein R stands for a substituent of the group consisting of hydrogen, alkyl, alkylene, aralkyl and cycloalkyl, and $X_1$, $X_2$, $X_3$, $X_4$ stand for substituents of the group consisting of hydrogen, alkyl, aryl and aralkyl, said products being clear, colorless, thermoplastic, balsam-like to solid resins.

2. Polymerization products of compounds of the following formula:

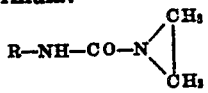

wherein R stands for a substituent of the group consisting of hydrogen, alkyl, alkylene, aralkyl and cycloalkyl, said products being clear, colorless, thermoplastic, balsam-like to solid resins.

3. Polymerization products of compounds of the following formula:

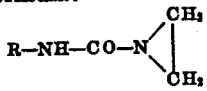

wherein R stands for alkyl, said products being clear, colorless, thermoplastic, balsam-like to solid resins.

4. Polymerization products of compounds of the following formula:

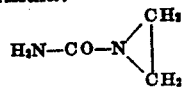

said products being clear, colorless, thermoplastic resins, soluble in water.

5. Polymerization products of compounds of the following formula:

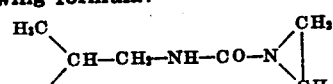

said products being clear, colorless, thermoplastic resins insoluble in water, soluble in ethanol and butanol.

6. Polymerization products of compounds of the following formula:

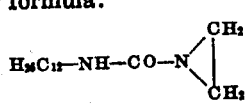

said products being clear, colorless, thermoplastic, wax-like resins.

HERBERT BESTIAN.